United States Patent [19]

Hlebakos

[11] Patent Number: 5,433,464
[45] Date of Patent: Jul. 18, 1995

[54] BRAKEABLE HAND TRUCK

[76] Inventor: Nichole R. Hlebakos, 585 Rossi Rd., Geyserville, Calif. 95441

[21] Appl. No.: 120,590

[22] Filed: Sep. 13, 1993

[51] Int. Cl.⁶ ............................ B62B 1/10; B60T 1/06
[52] U.S. Cl. ................................. 280/47.27; 188/22; 188/329
[58] Field of Search ............... 280/47.27, 47.28, 47.29, 280/33, 994; 188/22, 19, 329, 330, 2 D, 9, 10, 11, 20

[56] References Cited

U.S. PATENT DOCUMENTS

| | | |
|---|---|---|
| 550,569 | 11/1895 | Sutherland . |
| 690,449 | 1/1902 | Martin ................ 280/47.27 |
| 1,119,068 | 12/1914 | Compton et al. . |
| 1,504,368 | 8/1924 | Mulloy ..................... 188/11 |
| 1,609,685 | 12/1926 | Bidin . |
| 1,674,751 | 6/1928 | Von Luettwitz ............ 188/2 D |
| 1,985,346 | 12/1934 | Guimaraes ................ 188/10 X |
| 2,246,147 | 6/1941 | Smith . |
| 2,431,441 | 11/1947 | Willis ..................... 188/330 |
| 2,728,418 | 12/1955 | Dombeck .................. 188/329 |
| 2,733,074 | 1/1956 | Fuglie et al. . |
| 3,276,550 | 10/1966 | Honeyman . |
| 3,422,930 | 1/1969 | Barron . |
| 3,486,587 | 12/1969 | Malloy .................... 188/22 |
| 3,896,904 | 7/1975 | Walker ................. 280/47.27 X |
| 3,968,974 | 7/1976 | Wetzel . |
| 5,044,475 | 9/1991 | Clark ..................... 188/329 |

FOREIGN PATENT DOCUMENTS

| | | | |
|---|---|---|---|
| 512871 | 2/1921 | France ..................... 188/19 |
| 1170525 | 1/1959 | France .................... 188/329 |
| 1212301 | 3/1960 | France .................... 188/329 |

Primary Examiner—Brian L. Johnson
Attorney, Agent, or Firm—Malcolm B. Wittenberg

[57] ABSTRACT

A kit capable of converting a hand truck to one which is brakeable. A set of brake shoes are provided within appropriately sized wheels which are actuatable by a cable connected to each cam follower. At the mid-point of the cable is located a lever releasably attached to the hand truck frame. By this arrangement, equal pressure is applied to each brake shoe simultaneously to avoid the hand truck pulling in one direction when the brakes are applied.

7 Claims, 4 Drawing Sheets

BRAKEABLE HAND TRUCK

TECHNICAL FIELD OF THE INVENTION

The present invention deals with a brakeable hand truck and particularly a kit for converting an ordinary commercially available hand truck to one which is brakeable. Conversion is accomplished simply and conveniently without in any way changing the pre-existing hand truck frame.

BACKGROUND OF THE INVENTION

Hand trucks are notoriously well known for use in the manual transport of large and heavy packages over short distances. Such devices employ a generally upright load-supporting frame having a lifting blade projecting forwardly from the frame proximate a lower extreme thereof. Behind the lifting blade is a pair of laterally spaced wheels allowing the lifting blade to pass beneath a package to be transported and upon tilting the frame toward the hand truck operator, the package is supported by the combination of lifting blade and frame pivoted over the hand truck wheels.

It has been recognized that an adequate braking system would be a valuable addition to any hand truck assembly. Safety concerns dictate the need for such a system which would enable the operator to restrain a heavily loaded hand truck as it is moved down an inclined ramp to properly guide and balance the load without having to exert excessive physical force. Without adequate and reliable braking, a heavily loaded hand truck can pull the operator forcibly down an incline causing him to lose balance and injure both himself and the load.

Despite the obvious advantages in providing a hand truck with a suitable braking system, most hand trucks currently sold are vended without braking mechanisms of any type.

There have been a number of prior art attempts to provide hand trucks with braking mechanisms. For example, U.S. Pat. No. 3,276,550 teaches the use of a horizontally aligned bar which, when actuated, frictionally rubs against the tire surface. Obviously, a friction bar-type brake of this sort is only marginally adequate for it results in excessive tire wear, is only viable when the rubber tire surface is dry and provides braking action which varies with tire type and tread.

Another approach was suggested in U.S. Pat. No. 3,422,930 wherein a strap-type brake was provided. The strap is composed of a flexible material wrapped around a drum mounted to rotate in unison with the wheel so that the strap may be pulled tightly against the drum to produce braking friction. Again, this approach provides inadequate results. For example, the accumulation of dust and dirt between the strap and drum diminishes the friction producing surface area of the combination. Further, this approach together with the one discussed previously oftentimes results in an uneven braking action between the two wheels resulting in a pulling of the hand cart in a direction diagonal to the intended line of travel of the hand truck which can obviously result in an extremely dangerous condition.

Finally, none of the brake mechanisms taught by the prior art as being applicable to hand truck operation are capable of being conveniently used to retrofit existing non-brakeable hand trucks. As noted, the vast majority of hand trucks are sold without brakes and it was viewed as a prime object in the present invention to provide a kit capable of simply and conveniently modifying non-brakeable hand trucks in order to provide them with a brake assembly far superior to any previously suggested by the prior art. For example, U.S. Pat. No. 3,968,974 discloses an elaborate hydraulically operated disk brake system which cannot be added to an existing hand truck frame without extensive modification. Such modification would unduly add to the cost of such a product discouraging its adoption and use in practice.

SUMMARY OF THE INVENTION

The present invention involves a brakeable hand truck and a kit for converting a non-brakeable hand truck to one which is brakeable. The hand truck generally comprises an upright load supporting frame having a lifting blade projecting forwardly from the frame proximate a lower extreme thereof. A pair of laterally spaced wheels rotatable independently from one another mounted on an axle located to the rear of the frame are provided proximate the lifting blade for movably supporting the hand truck.

The invention includes a set of brake shoes functionally located within the above-noted laterally spaced wheels which are supported by backing plates, the combination of which are rigidly secured to the axle. A pair of cam followers are supported by backing plates and pivotal thereon such that rotation of each of the cam followers causes each of the brake shoes to expand to contact inner metal wear or drum surfaces of the wheels preventing their rotation.

A cable is provided which is connected at its extreme ends to the cam followers and at its midpoint to a pulley which is in turn connected to a turnbuckle and lever located on the supporting frame. Actuation of the lever causes substantially equal force to be imposed upon each cam follower due to the pulley which, in turn, results in substantially equal braking being imposed upon each wheel.

The present invention can be more readily appreciated when considering the following disclosure and appended drawings wherein:

BEIEF DESCRIPTION OF THE DRAWINGS

DETAILED DESCRIPTION OF THE INVENTION

Figure 1:
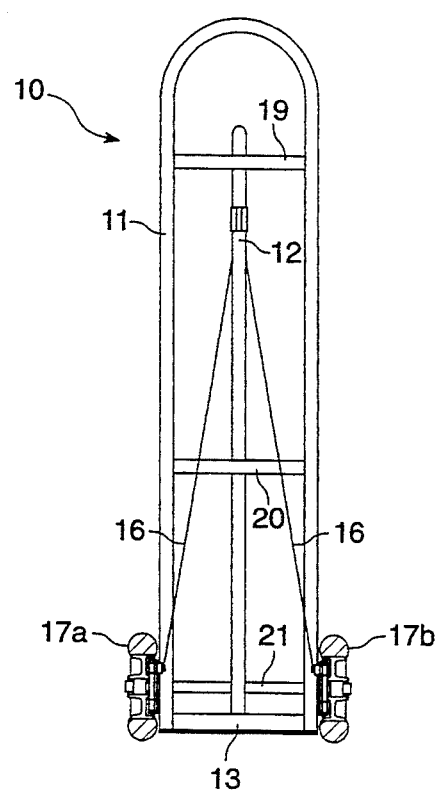
FIG. 1 is a front plan view of a brakeable hand truck assembly of the present invention.
Figure 2:
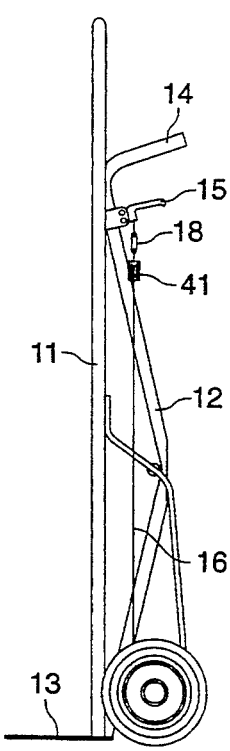
FIG. 2 is a side plan view of the hand truck assembly of FIG. 1.

Turning to FIGS. 1 and 2 collectively, hand truck 10 is depicted having a generally upright load supporting frame comprised of U-shaped tubular member 11, crossmembers 19 and 20 and center strut 12 terminating at its upper end at grip handle 14. Projecting forwardly from frame 11 is lifting blade 13 which is oriented perpendicularly from frame 11 as shown in FIG. 2. Lifting blade 13 accomplishes a dual function, namely the lift and support of objects to be moved by hand truck 10 as well as providing a stable platform for maintaining the upright orientation of tubular frame 11.

A pair of laterally spaced wheels 17a and 17b are provided which are rotatable independently from one another being mounted on axle 21 located to the rear of frame 11 proximate lifting blade 13. Ideally, tires 22 (FIG. 4) are cushioned providing for increased stability against tipping by reducing shocks from moving over bumps or objects.

Figure 3:
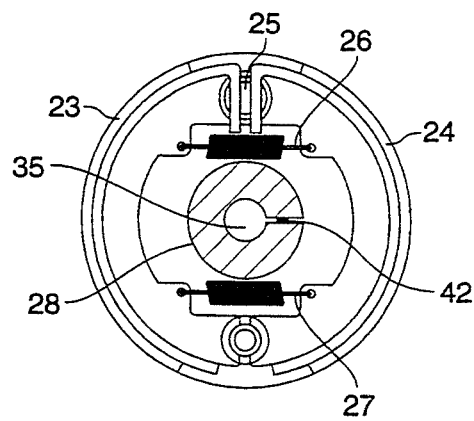
FIG. 3 is a front view of the drum brake assembly for use herein.
Figure 5:
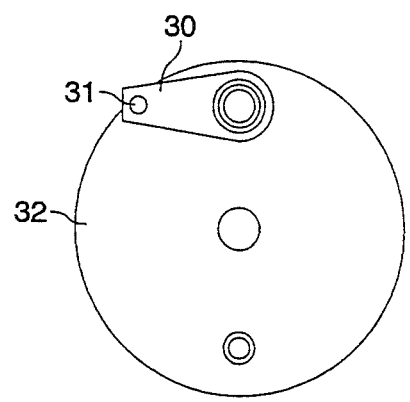
FIG. 5 is a plan view of a backing plate assembly used in connection with the brake assembly of FIG. 3.

Turning to FIG. 3, a set of brake shoes 23 and 24 are located on backing plate 32 (FIGS. 5 and 6) and are maintained in contracted confirmation through the use of spring members 26 and 27. Opening 25 is provided for the acceptance of cam follower 30 such that rotation of cam follower 30 will expand the spacing between brake shoes 23 and 24 in opposition to springs 26 and 27 bringing the brake shoes in contact with an inner surface of wheels 17a and 17b at points of contact 33 and 34 (FIG. 6).

The brake shoe assembly shown in FIG. 3 is appended to axle 21 at opening 35 and is maintained in non-rotational contact through the tightening of set screw 29 on split collar 42. As such, as brake shoes 23 and 24 contact the inner break drum surfaces of rotating wheels at 33 and 34, rotation of the wheels ceases providing for the braking of hand truck 10.

Figure 7:
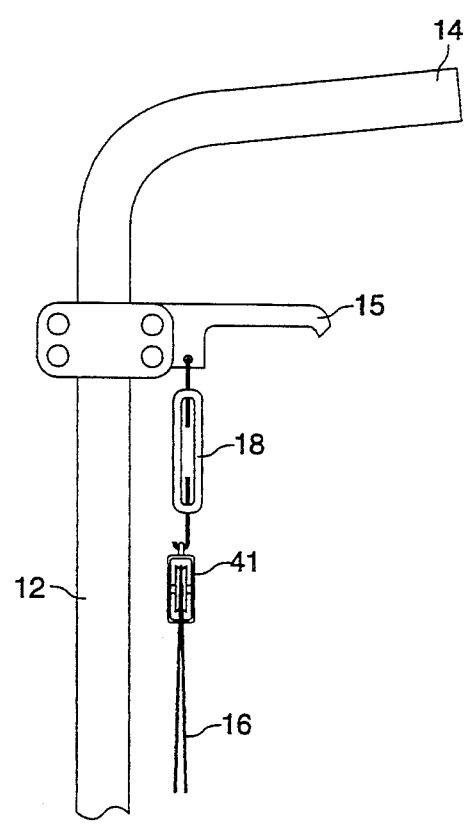
FIG. 7 is a partial plan view of the handle, lever, pulley and turnbuckle assembly for use herein.

Cable 16 is connected at its extremes to cam follower 30 at opening 31 at each wheel. The mid-point of the cable is appended to pulley 41 which is, in turn, connected to turnbuckle 18 and lever 15 which, in turn, is connected to center strut 12 (FIG. 7). Such a configuration is an important element of the present invention whereby actuation of cam follower 30 through a lifting of handle 15 must provide equal tension to each set of brake shoes 23-24 which, in turn, eliminates the tendency of prior brakeable hand trucks to brake unevenly causing the hand trucks, particularly under heavy load, to deviate in an unwanted direction. Through the present design, pressure between the brake shoes and the wheels at contact areas 33 and 34 remains substantially equal across both wheels virtually eliminating the uneven braking action characteristic of prior products.

Figure 4:
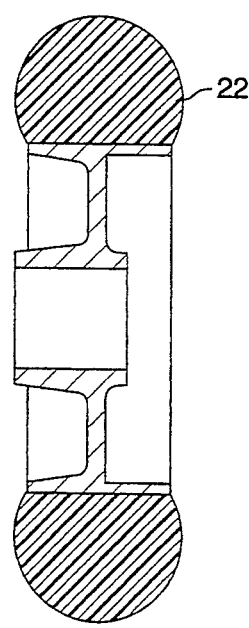
FIG. 4 is a cross-section of a wheel assembly for use herein.
Figure 6:
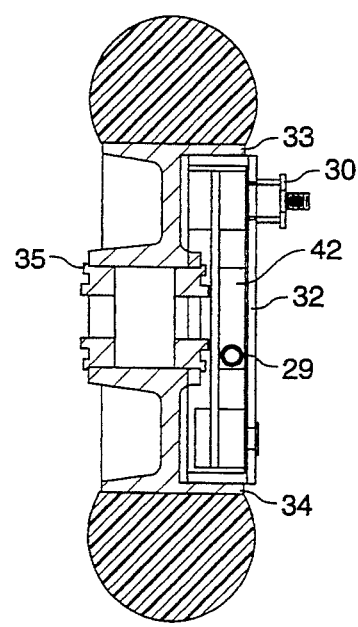
FIG. 6 is the wheel assembly of FIG. 4 together with the drum brake assembly of FIG. 3 mounted therein.

In converting a non-brakeable commercially available hand truck to one which is brakeable, one need only remove the wheels and apply a new set of wheels 17a-17b which are configured to accept the present brake shoe/backing plate assembly (FIGS. 4 and 6). The brake shoe/backing plate assembly including cam follower 30 can be simply applied to existing axle 21 by tightening set screws 29 across split collar 42. Handle 15 can then be applied to tubular center strut member 12 through the use of a simple two-screw/bolt assembly positioned on tubular member 12 to provide for the convenient gripping of handle 15 simultaneously with handle 14 when the braking mechanism is to be actuated. Proper positioning of handle 15 on tubular member 12 can be provided by cutting an appropriate length of cable 16 through orifice 31 found in each cam follower 30. In fact, fine tuning of cable 16 can be provided by turnbuckle 18 connecting cable pulley 41 to handle 15. As such, as the brake shoes wear causing slack to develop within cable 16, the turnbuckle can be rotated to adjust the tension on the cable. Through the use of pulley 41, the tension on each leg of cable 16 is maintained substantially equal to provide for equal braking force being applied at each wheel.

In summary, the present invention is capable, when viewed as a kit, to readily and conveniently convert an ordinarily commercially available hand truck to one which is brakeable while maintaining the same frame-lifting blade-axle configuration found in the non-brakeable model. Yet a further advantage over brakeable designs of the prior art is the uncomplicated, straight-forward and simplistic manner in which a brakeable hand truck can be provided which virtually eliminates any possibility of differential wheel braking resulting in pulling of the hand truck in an unwanted direction during brake application. Through the present design, both wheels are provided with brake shoes which offer equal braking pressure through the actuation of a single centrally located handle.

I claim:

1. A brakeable hand truck comprising the combination of:
    a. a generally upright load supporting frame having a lifting blade projecting forwardly from the frame proximate a lower extreme thereof;
    b. a pair of laterally spaced wheels rotatable independently from one another mounted on an axle located to the rear of said frame proximate said lifting blade for movably supporting said hand truck;
    c. a set of brake shoes functionally located within said laterally spaced wheels and supported by backing plates, the combination of which are non-rotatably secured to said axle;
    d. a pair of cam followers supported by said backing plates and pivotable thereon such that rotation of each of said cam followers causes each of said brake shoes to expand to contact said wheels preventing rotation thereof; and
    e. a cable connected at the cable's extremes to said cam followers and at the cable's midpoint to a pulley and lever connected said supporting frame such that actuation of said lever causes substantially equal rotation force being imposed upon each cam follower which, in turn, results in substantially equal braking being imposed upon each wheel.

2. The brakeable hand truck of claim 1 wherein said pair of laterally spaced wheels are rotatably supported on a single common axle attached to said frame.

3. The brakeable hand truck of claim 1 wherein said pulley is connected to said lever through a turnbuckle for adjusting the tension on said cable.

4. The brakeable hand truck of claim 1 wherein said lever is bolted to a supporting frame originally configured for use as a non-brakeable hand truck.

5. The brakeable hand truck of claim 1 wherein said wheels, brake shoes and backing plates are capable of being removably attached to a supporting frame originally configured for use as a non-brakeable hand truck.

6. A kit for the conversion of a non-brakeable hand truck to one that is brakeable, said non-brakeable hand truck comprising a generally upright, load supporting frame having a lifting blade projecting forwardly from the frame proximate a lower extreme thereof, and an axle for supporting a pair of laterally spaced wheels rotatable independently from one another, the axle being mounted to the rear of the frame proximate said lifting blade, the kit comprising:
    a. a set of brake shoes to be located within appropriately sized wheels;

b. a set of wheels for being rotatably supported by said axle and each of which being sized to provide drum surfaces for said brake shoes;

c. backing plates for supporting said brake shoes, the combination of which being provided with means for non-rotatable attachment to said axle;

d. a pair of cam followers to be supported by said backing plates being pivotable thereon such that rotation of each of said cam followers causes each of said brake shoes to expand to contact said wheel drum surfaces to prevent rotation thereof;

e. a cable of sufficient length to be connected to said cam followers at the cable's extremes and to a pulley and then lever at the cable's midpoint; and f. a lever and means for attachment of the lever to said upright load supporting frame and to said pulley such that actuation of said lever causes a pulling action to be imposed upon said cable which, in turn, results in a substantially equal rotational force imposed upon each said cam followers resulting in substantially equal braking being imposed upon each wheel.

7. The kit of claim 6 further comprising a turnbuckle for connecting said pulley to said lever for adjusting the tension on said cable.

* * * * *